Feb. 19, 1957　　A. G. PERKINS　　2,781,773
CONTROL UNIT FOR MILKING MACHINES
Filed Nov. 8, 1952　　　　　　　　　　2 Sheets-Sheet 1
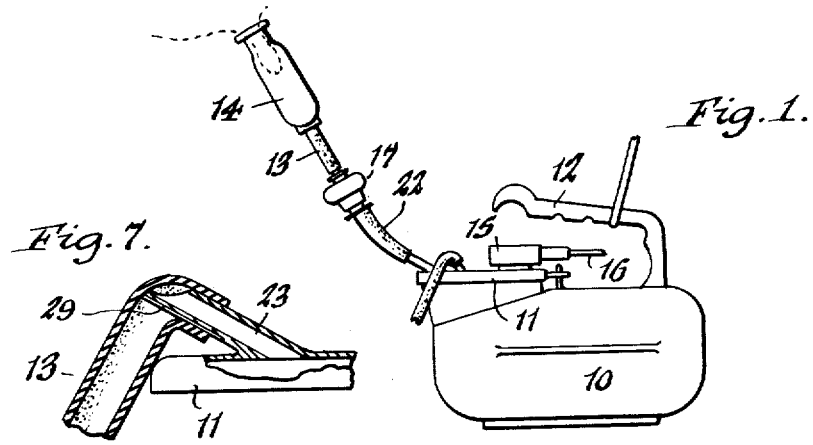
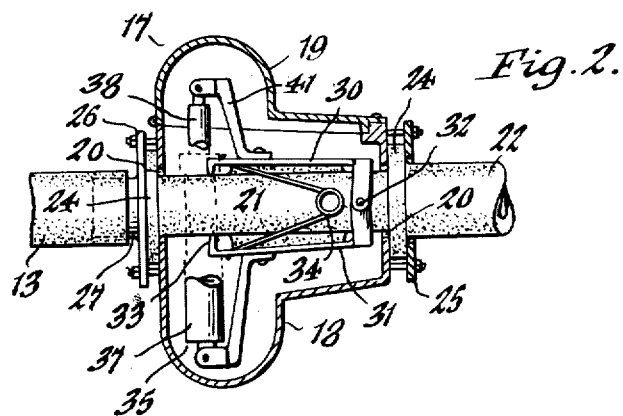
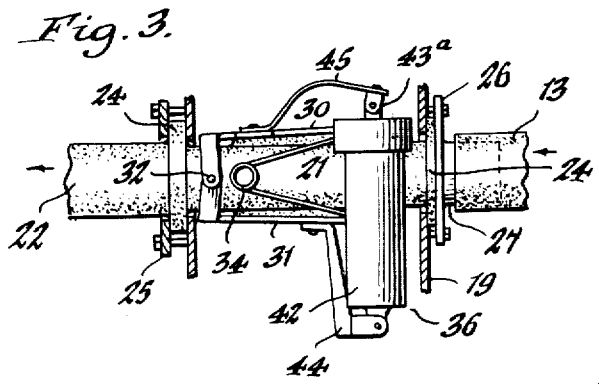
INVENTOR
Albert G. Perkins
BY
Walter P. ———
ATTORNEY

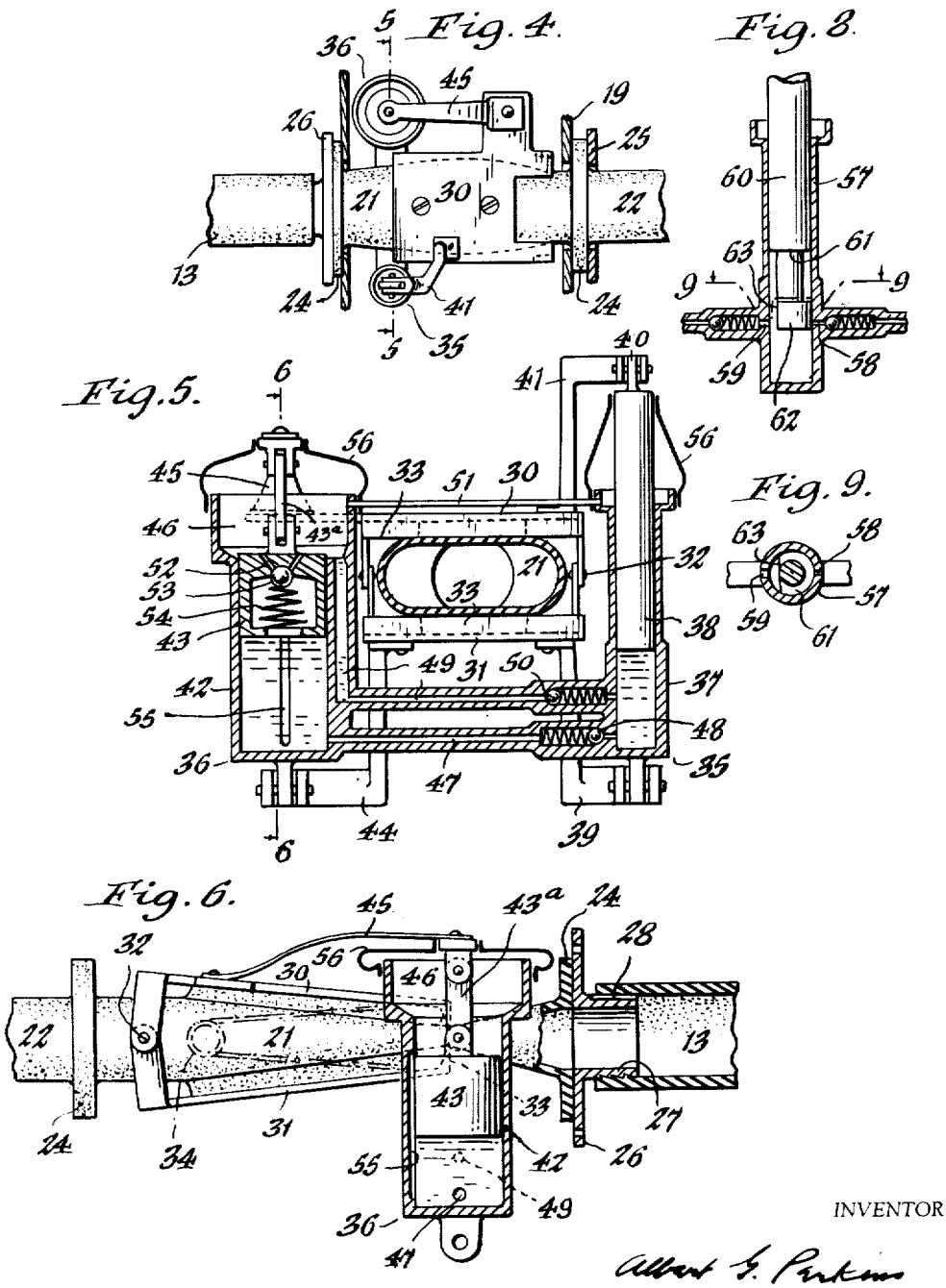

United States Patent Office 2,781,773
Patented Feb. 19, 1957

2,781,773

CONTROL UNIT FOR MILKING MACHINES

Albert G. Perkins, Grand Island, N. Y.

Application November 8, 1952, Serial No. 319,504

15 Claims. (Cl. 137—455)

This invention relates to an automatic control unit for milking machines for causing the automatic dropping of the teat cups from the cow as the respective quarters of the cow's bag are milked out and thereby prevent injury to the cow when the machine is left on too long.

One of the objects of the invention is to provide a control unit of this character which is so designed and constructed as to positively shut off the vacuum through the teat cup connection after the flow or surge of milk from the companion quarters of the cow's bag has substantially ceased to thereupon cause that cup to be released and drop by gravity from the cow, and which at the same time effectually restrains the vacuum collapse of the unit during normal milking operations, as well as during hold over periods, as when the cow holds up on her milking.

Another object is to provide a control unit for milking machines which effectually and automatically governs the time period of the milking operation of each quarter of the cow's bag to assure an unrestricted flow of milk from the cow until a predetermined and critical time has been reached in the milking operation, as when the milk flow substantially ceases.

A further object of the invention is to employ a simple and compact hydraulic assembly for positively controlling the shutting off of the vacuum through the teat cup connection after the flow of milk substantially ceases and yieldingly and releasably restrain any tendency to shut off such vacuum during the so-called hold over periods.

Other features of the invention reside in the construction and arrangement of parts hereinafter described and particularly pointed out in the appended claims.

In the accompanying drawings:

Figure 1 is a side view of a milking machine in operative relation to the cow and showing my control device in one of the teat cup connections thereof, one of the connections being shown as having automatically been dropped from the cow after the companion quarter of the cow's bag had been milked out. Figure 2 is a side elevation of the control unit, with the casing in section. Figure 3 is a similar view but looking from the opposite side of the control unit. Figure 4 is a top plan view thereof with the casing removed. Figure 5 is an enlarged cross section taken on line 5—5, Figure 4. Figure 6 is a vertical section taken substantially in the plane of line 6—6, Figure 5, with the tube section partially collapsed. Figure 7 is an enlarged fragmentary vertical section of one of the can cover intake tubes and its hose connection, the latter being in the position it assumes after dropping from the cow. Figure 8 is a vertical section of a modified form of one of the cylinder and piston units. Figure 9 is a cross section thereof taken on line 9—9, Figure 8.

Similar characters of reference indicate corresponding parts throughout the several views.

By way of example, I have shown my teat cup dropping control device applied to a well known type of vacuum or pulsating milking machine wherein 10 indicates the milk-receiving can having a cover 11 and bail 12, the cover having the usual milk intake tubes radiating therefrom and each connected by a flexible hose or connection 13 having a teat cup 14 at its free end for detachable connection to one of the cow's teats. Also applied to the cover is the customary pulsator 15 which is connected by a hose 16 to the suction source. Interposed in each hose connection 13 is one of my control units, indicated generally by the numeral 17, through which the milk flows from the cow to the can and which functions as a valve to automatically shut off the vacuum as the companion quarter of the cow's bag is milked out and cause its teat cup to drop by gravity from the cow, as depicted in Figure 1, to effectually prevent injury to the cow from overmilking, and subsequently cause the automatic restoration of the unit to its initial position.

In its preferred construction shown in the drawings, the control unit consists of a body or casing 18 constituting a support or housing for its working parts and having a hinged or removable cover 19 at one side thereof and axially-alined openings 20 at its opposite ends. Extending through these end openings are the intake and discharge ends of a flexible, contractible tube-like conduit section or valve member 21 of rubber or like material extending lengthwise through the casing in spaced relation to its surrounding walls and disposed in interposed milk flow communication with the companion teat cup connection 13. The discharge end of this tube section has a thicker-walled extension 22 for connection to one of the cover intake tubes or spouts 23 radiating from the can-cover 11, as seen in Figure 1. At its ends, for abutting engagement with the end walls of the casing 18 about its openings 20, this contractible tube section has attaching flanges 24 for detachably securing it by clamping plates 25, 26 thereto. The clamping plate 26 has a nipple 27 formed thereon to which the discharge end of the teat cup connection 13 is connected. A capillary-like vent passage 28 is disposed between the latter and such nipple, as shown in Figure 6, to properly vent the teat cup connection to the atmosphere after the tube section has been collapsed or contracted, as hereinafter described to permit the teat cup to drop from the cow. A similar vent passage 29 is provided in the underside of each of the milk can intake spouts 23, as shown in Figure 7, with the tube section extension 22 encircling such spout for the purpose of properly venting the control unit to restore the collapsed tube section 21 and its associated parts to their initial position after the teat cup drops from the cow. It will be noted, in the dropped position of the released teat cup, that the top side of the tube extension closes over and seals the intake end of the spout to close off the vacuum to the control unit.

Applied to the diametrically opposite faces of the contractible tube section 21, to move therewith and for causing its uniform collapse to a transversely closed position to shut off the vacuum to the teat cup when the flow of milk from the companion quarter of the cow's bag has substantially ceased, are top and bottom tube-embracing plates 30, 31 hinged to each other at 32 adjacent the discharge end of the tube section in substantially the axial plane thereof and provided at their opposite or free ends with tube-engaging jaws 33 for pinching and sealing the tube section in its contracted position shown in Figure 6. A light spring 34 may be interposed between these jaw plates for augmenting the action of the resilient tube section in restoring these parts to their open or expanded position subsequently to the teat cup dropping from the cow.

Operatively interposed between the free ends of the jaw-plates 30, 31 and exteriorly of the adjoining portions of the tube section 21 is a fluid or hydraulic control assembly for governing the vacuum-urged contraction of the tube section in such a manner that such tube section is kept open during the milking operation to assure the constant and unrestricted flow of milk from the cow and is effectually restrained against complete collapse until a predetermined and critical time has been reached in the milking operation, as when the milk flow substantially ceases, whereupon the restraining action normally opposing collapse of the tube section is automatically released or caused to be removed to permit the complete collapse and closing of the tube section in a prompt and quick fashion. This control assembly preferably comprises two cylinder and piston units 35, 36 or the like disposed in intercommunicating relation for the displacement or interflow of a relatively constant viscosity fluid from one unit to the other and vice versa during the contracting and expanding movements of the tube section, one unit 35 being disposed at one side of the tube section and being primarily a pump, although in the total effect it has a dash-pot-like action to govern the gradual contraction of the tube section as will appear more clearly hereinafter. The companion unit 36, hereinafter sometimes called the dash-pot unit, is disposed at the opposite side of the tube section and serves to automatically reset the assembly to its point of operation and acts with a relatively constant force to restrain the vacuum-initiated collapse of the tube section at all times except at that particular time in the milking operation when the companion quarter of the cow's bag has been milked out. The pump unit 35 consists of a cylinder 37 closed at its lower end and open at its upper end and charged with a synthetic oil, which does not change substantially in viscosity in varying degrees of temperature, and a piston 38 operating therein, the closed lower end of the cylinder being pivotally supported or trunnioned on a bracket 39 projecting from the free end of the lower jaw-plate 31 and the piston having a rod or stem 40 rising therefrom and pivotally connected to a like bracket 41 projecting from the corresponding end of the companion or upper jaw-plate 30. A surge of milk through the tube section expands the jaw-plates and causes the outward reciprocation of the cylinder and piston elements while the vacuum therein effects the contraction of the plates and the inward reciprocation of such elements.

The companion unit 36 consists of a cylinder 42 having a relatively larger bore than the cylinder 37 and also closed at its lower end and open at its upper end and having a piston 43 operating therein, the cylinder being pivotally joined to a bracket 44 on the lower jaw-plate 31 and the piston being pivotally joined by a link connection 43a to the free end of a leaf spring 45 applied to the upper jaw-plate 30. The cylinders of the two units 35, 36 are in fluid communication at their lower ends through a transverse passage 47 having a spring-urged check valve 48 therein adapted to open toward the cylinder 42 to displace the fluid thereto upon an inward stroke or relative reciprocation of the companion smaller cylinder and piston 37, 38. The fit of the piston 43 in its cylinder is such that a leakage or capillary upward flow of fluid takes place about the same during an inward reciprocation of the units and this displaced fluid passes into an overflow well or chamber 46 formed at the upper end of the larger cylinder 42 and communicates with the lower end of the companion smaller cylinder through a fluid return passage 49 having a spring-urged check valve 50 therein adapted to open toward such smaller cylinder to displace the fluid thereto upon an outward reciprocation of the cylinder and piston 37, 38. Any fluid leakage past the piston 38 into the upper end of its cylinder 37 is conducted through a transverse tube or passage 51 opening into the well 46. The piston 43 is recessed at its lower end and its head has one or more ports 52 therein normally closed by a downwardly-opening fluid check valve 53 backed by a coil spring 54 disposed within the piston-recess. During an expansion stroke of the cylinder and piston units this check valve opens to displace the fluid above the piston into the cylinder below the piston. In its bore the cylinder 42 has a longitudinal groove or by-pass 55 therein with which the piston 43 registers in a predetermined contracted position of the jaw-plates 30, 31, short of complete contraction to a tube sealing position, with the fluid circulating freely through said by-pass from the bottom to the top of the cylinder during the final contracting stroke imparted to the units 35, 36 and resulting in such final stroke being a quick one to permit a prompt and smart final closing of the tube section to its vacuum shut off position.

Applied to the open end of each cylinder 37, 42 for the purpose of fluid-sealing the same is a flexible-walled boot 56 of rubber or like material which is longitudinally fluted or corrugated and whose contracted upper end is fitted in fluid-sealed relation to the stem of the companion piston 38, 43, the boot being free to flex during the relative reciprocating movements of the cylinders and pistons.

In operation, each control unit operates independently to shut off the vacuum to its teat cup when the companion quarter of the cow's bag is milked out and during the pulsating cycles of the milking machine the tube section 21 is caused to alternately expand and contract in response to the surges of milk and the vacuum therein and during this operation it is necessary to keep this tube section open and restrain the vacuum from collapsing it until a predetermined and critical time of that operation, as when the flow of milk substantially ceases. During this expanding and contracting or breathing-like action of the tube section, the pump unit 35 responds thereto to pump, on its inward stroke, fluid from its cylinder 37, through the passage 47 and into the cylinder 42 of the companion unit 36. This displacement of additional fluid under pressure into the latter tends to cause a relative outward displacement of its piston 43 a proportionate distance, with the spring 45 being tensioned to restrain the collapse of the tube section and keep it open for the free flow of milk therethrough, and with some of the fluid escaping outwardly through the capillary-like space about the piston into the upper end of its cylinder and thence into its well 46 from which it flows into the return passage 49. On the outward stroke of the pump unit 35, the check valve 50 in this return passage is opened and its cylinder replenished with the fluid previously displaced. It is pointed out here that the contracting force of pressure differential provided by the vacuum in the milk tube relative to the atmospheric pressure outside the tube is substantially constant and the restraining force of the spring 45 is likewise constant. However, as the surges of milk become less and less the tube section, together with the jaw-plates 30, 31, is slowly contracted with the fluid in the pump unit 35 being displaced into the unit 36 and with the piston 43 in the latter relatively displaced inwardly by the spring 45 to bring it into register with the cylinder by-pass 55 when the tube section is just short of its fully contracted position. At this time the fluid is allowed to escape freely and quickly outwardly through this by-pass with the result that the aforementioned pressure differential provided by the vacuum is permitted to cause the complete contraction of the tube section to its closed sealing position. During the tail end of this contraction operation, the tension of the spring 45 is bent and becomes relaxed so that said pressure differential can completely close the tube section without restraint and maintain it closed until the teat cup is subsequently automatically released from the cow, at which time the tube section is vented to the atmosphere through the vents 28 and 29. Thereupon, the tube section is expanded to its initial open position, as are the cylinder and piston units, and during the outward stroke of the pistons 38, 43, the check valve 53 of the latter is opened to return the displaced fluid to the closed end of the cylinder 42 and the check valve in the return passage 49 is likewise opened to re-charge the cylinder 37 with fluid.

It sometimes happens that a cow is apt to hold up on her milk at the beginning of the milking operation, due to nervousness or fright, for say ½–¾ of a minute and it is necessary under those conditions and at that particular time to prevent the vacuum collapse of the tube section. For the purpose of providing an accurate and positive timing action of my control unit, as well as adjusting it to meet those hold over periods or conditions, I have shown a modification of the pump unit 35 in Figures 8 and 9. The cylinder 57 thereof is provided at its lower end with an outlet port 58 adapted for connection through the check-valved passage to the lower end of the companion unit 36 and an intake port 59 adapted for connection through the check-valved passage to the upper end of such unit 36, as in the previous construction. In this modification, the piston 60 operating in the cylinder 57 also functions as a valve for cutting off the flow of fluid from this cylinder to the companion unit 36 during a hold over period and for governing the opening of the outlet port 58 at a predetermined point in the inward or tube-collapsing stroke of the piston. To this end the inner or lower portion of the latter has an annular groove 61 therein defining a valve head or member 62 normally extending over and closing such port against the discharge of fluid to the unit 36 and having a flat face 63 at one side in spaced relation to the opposing side of the cylinder wall so as not to close over the inlet port 59 through which the fluid is drawn on the up or out-stroke of the piston. The upper or main portion of the piston has a capillary like fit in its cylinder so that on its inward stroke the fluid can leak or slowly escape past the same and the piston accordingly move slowly with the contraction of the tube section until its groove 61 uncovers the port 58 to allow the fluid to be discharged therethrough in response to the resulting pump action and at a predetermined time to cause the restraining means to be released and the tube section and its embracing jaws to be quickly and completely collapsed to their closed vacuum sealed position. The piston-groove is of a length to register with the outlet port during the final inward stroke of the piston, while in its outward position, when the teat cup is applied to the cow, the lower end of the valve head 62 of the piston covers the outlet port.

While that part of the fluid or hydraulic control assembly designated in the specification and claims as the dash-pot cylinder and piston unit 36 does not function pump-wise as does the companion unit 35, its piston and cylinder elements do reciprocate in relation to each other in response to the pump action of the pump unit 35. However, the piston 43 does function as a hydraulic valve in governing the flow of fluid pumped to it by the pump unit 35 to restrain the collapse of the tube section until a predetermined time in the milking operation. It will be seen further that the unit 36 is responsive to the pump unit 35 and constitutes more than a simple dash-pot arrangement, having by reason of its responsive relation to the first unit a hydraulic jack function. This system provides dual contraction restraining connections to the tube embracing means 30, 31 one of which connections is resilient through the spring 45 and biases that embracing means with a force adjusted by the position of the piston 43 so that a substantially constant tube contraction restraining force is supplied which operates to hold the tube in a more fully dialated or open position than would usually result from use of a simple dashpot mechanism.

I claim as my invention:

1. A control device for shutting off the vacuum to the teat cup of a milking machine when the surge of milk substantially ceases, comprising a flexible contractible milk and vacuum flow tube section, means in substantially embracing relation to said tube section applied thereto to move as an expanding and contracting unit therewith in response to the variation in vacuum therein and contractible about such section to a closed sealing position when the surges of milk substantially cease, and a fluid pump unit interposed between said embracing means for actuation in response to the contracting and expanding movements of the tube section and including a cylinder having an outlet port and an inlet port and a piston operating therein and having a portion at its inner end normally covering said outlet port and a grooved portion adapted to register with said outlet port when said embracing means is contracted to a predetermined degree and fluid transfer resisting load means connected to one of said ports to retard inward motion of said piston when said outlet port is uncovered.

2. A control device for shutting off the vacuum to the teat cup connection of a milking machine when the surge of milk substantially ceases, comprising a flexible contractible milk and vacuum flow tube section adapted for interposition in the teat cup connection, means in substantially embracing relation to said tube section applied thereto to move as a unit therewith in response to the variation in vacuum therein and contractible about the same to a closed sealing position when the surges of milk substantially cease, hydraulic control means displaceably interposed between said embracing means and actuated in response to the contracting and expanding movements of the tube section, and means in operative governing relation to said hydraulic control means for restraining the collapse of the tube section with a relatively constant force during normal flow conditions and releasable at a time when such flow substantially ceases to permit the complete collapse of the tube section to its closed sealing position.

3. A control device for shutting off the vacuum to the teat cup of a milking machine when the surge of milk substantially ceases, comprising a flexible contractible milk and vacuum flow tube section, means in substantially embracing relation to said tube section applied thereto to move as an expanding and contracting unit therewith in response to the variation in vacuum therein and contractible about such section to a closed sealing position when the surges of milk substantially cease, fluid pump means interposed between said embracing means in operative relation thereto for actuation by the cyclic contracting and expanding movements thereof, and dashpot means including a yieldable connection to said embracing means, said dashpot means having fluid connection to said pump means and being disposed relative to said embracing means to be responsive to said actuation of said pump means to bias said embracing means through said yieldable connection thereto against contraction toward said closed sealing position.

4. A control device for shutting off the vacuum to the teat cup of a milking machine when the surge of milk substantially ceases, comprising a flexible contractible milk and vacuum flow tube section, means in substantially embracing relation to said tube section applied thereto to move as an expanding and contracting unit therewith in response to the variation in vacuum therein and contractible about such section to a closed sealing position when the surges of milk substantially cease, and dashpot means having a displaceable fluid medium therein, said dashpot means comprising a resilient connection to said embracing means and being operatively interposed between said embracing means through said connection for retarding the collapse of the tube section to its closed sealing position during normal milking operations, and means connected to said dashpot means and arranged to be responsive to cyclic expanding and contracting motion of said tube section and adapted to restore fluid to said dashpot means during said cyclic motions to compensate for fluid transfer within the dashpot means for restraining the collapse of said tube section except at a predetermined time when the flow of milk through the tube section and said cyclic motions have substantially ceased.

5. A control device for shutting off the vacuum to the teat cup of a milking machine when the surge of milk substantially ceases, comprising a flexible contractible milk and vacuum flow tube section, means in substantially embracing relation to said tube section secured thereto to move therewith in response to the variation in vacuum therein and contractible about such section to a closed sealing position when the surges of milk substantially cease, a fluid pump unit secured to said embracing means for actuation thereby in response to the contracting and expanding movements of the tube section, and a dashpot unit comprising cylinder and piston means, said cylinder means having fluid communication with said pump unit and being secured to one element of said embracing means, and yieldable connection means securing said piston means to the opposing element of said embracing means, said pump unit being operable in response to collapsing movements of said tube section to maintain substantially constant pressure in said cylinder means for restraining collapse of said tube section.

6. A control device for shutting off the vacuum to the teat cup of a milking machine when the surge of milk substantially ceases, comprising a flexible contractible milk and vacuum flow tube section, means in substantially embracing relation to said tube section secured thereto to move therewith in response to the variation in vacuum therein and contractible about such section to a closed sealing position when the surge of milk substantially ceases, a pair of intercommunicating fluid cylinders having pistons operating therein and connection means securing the same to said embracing means for relative pump-like reciprocation in response to the movements thereof, a first of the cylinder-piston units having a space of capillary dimensions therebetween for leakage of fluid past the same and the cylinder thereof having a by-pass therein with which its piston is adapted to register for opening the by-pass at a predetermined point in the contraction of the tube section and its embracing means, the connection means between said piston of said first unit and said embracing means being yieldable, the other of the cylinder-piston units being operable in response to contracting movements of said tube section to maintain substantially constant pressure in said cylinder of said first unit prior to opening of said by-pass therein for restraining collapse of said tube section.

7. A control device for shutting off the vacuum to the teat cup of a milking machine when the surge of milk substantially ceases, comprising a flexible contractible milk and vacuum flow section, means in substantially embracing relation to said tube section secured thereto to move therewith in response to the variation in vacuum therein and contractible about such section to a closed sealing position when the surges of milk substantially cease, a pair of fluid-charged cylinder and piston units and connection means operatively securing the same between said embracing means for relative displacement in response to the contracting movements thereof, and valved passages connecting the cylinders with each other for the interflow of fluid therebetween, said cylinder of a first of said units having a by-pass therein with which its piston is adapted to register for opening the by-pass in a given contracted position of the tube section, the connection means between said piston of said first unit and the adjoining portion of said embracing means being yieldable, the other of said units being operable in response to contracting movements of said tube section to maintain substantially constant pressure in said cylinder of said first unit prior to opening of said by-pass therein for restraining collapse of said tube section.

8. A control device for shutting off the vacuum to the teat cup of a milking machine when the surge of milk substantially ceases, comprising a flexible contractible milk and vacuum flow section, means in substantially embracing relation to said tube section secured thereto to move therewith in response to the variation in vacuum therein and contractible about such section to a closed sealing position when the surges of milk substantially cease, a pair of fluid-charged cylinder and piston units and connection means operatively securing the same between said embracing means for relative displacement in response to the contracting movements thereof, and valved passages connecting the cylinders with each other for the interflow of fluid therebetween, said cylinder of a first of said units having a by-pass therein with which its piston is adapted to register for opening the by-pass in a given contracted position of the tube section, said last-named piston having a valved port therein for the escape of fluid therethrough during its outward stroke, the connection means between said piston of said first unit and the adjoining portion of said embracing means being yieldable, the other of said units being operable in response to contracting movements of said tube section to maintain substantially constant pressure in said cylinder of said first unit prior to opening of said by-pass therein for restraining collapse of said tube section.

9. In a control device of the character described, a collapsible tube section having jaw-plates secured to its opposite sides and hinged to each other to expand and contract therewith, an intercommunicating fluid-displaceable assembly interposed between the free ends of said jaws including a pair of fluid-connected cylinders pivotally connected to one of the jaw-plates and pistons operable therein, the piston of a first of the cylinder and piston units being pivotally connected to the opposing jaw-plate and the piston of the other cylinder and piston unit having a yieldable connection to such opposing jaw-plate, and means in one of said cylinder and piston units for permitting a quick displacement of fluid therein when such parts reach a predetermined relative contracted position, said first unit being operable in response to collapsing movement of said tube section to maintain a substantially constant pressure in the cylinder of said other unit prior to operation of said quick displacement means for restraining collapse of said tube section.

10. In a control device of the character described, a collapsible tube section having jaw-plates secured to its opposite sides and hinged to each other to expand and contract therewith, an intercommunicating fluid-displaceable assembly interposed between the free ends of said jaws including a pair of fluid-connected cylinders pivotally connected to one of the jaw-plates and pistons operable therein, the piston of a first of the cylinder and piston units being pivotally connected to the opposing jaw-plate and the piston of the other cylinder and piston unit having a yieldable connection to such opposing jaw-plate, and means in one of said cylinder and piston units for permitting a quick displacement of fluid therein when such parts reach a predetermined relative contracted position, said first unit being operable in response to collapsing movement of said tube section to maintain a substantially constant pressure in the cylinder of said other unit prior to operation of said quick displacement means for restraining collapse of said tube section, the piston of said other unit having a valved port therein for the escape of fluid therethrough during its outward stroke.

11. A control device for shutting off the vacuum to the teat cup of a milking machine when the surge of milk substantially ceases, comprising a flexible contractible milk and vacuum flow tube section, means in substantially embracing relation to said tube section secured thereto to move therewith in response to the variation in vacuum therein and contractible about such section to a closed sealing position when the surges of milk substantially cease, a fluid pump unit secured to said embracing means for actuation thereby in response to the contracting and expanding movements of the tube section and including a cylinder having an outlet port and an inlet port and a piston operating therein and having a portion at its inner end normally covering said outlet port and a grooved portion adapted to register with said outlet port when said embracing means is contracted to a predetermined degree, and a dashpot unit comprising cylinder and piston means, said dashpot cylinder means having fluid communication with the outlet and inlet ports of said pump unit to be responsive to the pumping action of said pump unit after said grooved portion registers with said outlet port and being secured to one element of said embracing means, and yieldable connection means securing said piston means to the opposing element of said embracing means, said pump unit being operable after said outlet port is uncovered in response to collapsing movements of said tube section to maintain substantially constant pressure in said dashpot cylinder means for restraining collapse of said tube section.

12. A control device for shutting off the vacuum to the teat cup of a milking machine when the surge of milk substantially ceases, comprising a flexible contractible milk and vacuum flow section, means in substantially embracing relation to said tube section secured thereto to move therewith in response to the variation in vacuum therein and contractible about such section, to a closed sealing position when the surges of milk substantially cease, a pair of fluid-charged cylinder and piston units and connection means operatively securing the same between said embracing means for relative displacement in response to the contracting movements thereof, said cylinder of a first of said units having an outlet port and an inlet port therein and its companion piston having a valve portion thereon in governing relation to said outlet port for controlling the passage of fluid therefrom, and valved passages connecting said ports with the cylinder of the second unit for the interflow of fluid therebetween, said cylinder of said second unit having a by-pass therein with which its piston is adapted to register for opening the by-pass in a given contracted position of the tube section, the connection means between said piston of said second unit and the adjoining portion of said embracing means being yieldable, said first unit being operable in response to contracting movements of said tube section to maintain substantially constant pressure in said cylinder of said second unit prior to opening of said by-pass therein for restraining collapse of said tube section.

13. In a control device for milking machines, a collapsible tube section having jaw-plates secured to its opposite sides and hinged to each other at one end to expand and contract therewith, a fluid pump-like unit including a cylinder and piston secured to the free ends of said jaw plates to be operatively interposed therebetween for relative displacement in response to the movements thereof, dashpot means disposed in like manner between the jaw-plates and having fluid passages including check valves therein connecting opposite end portions of the cylinder means thereof with an inlet port and an outlet port provided in the cylinder of said pump unit, the piston of the latter being provided with a valve portion in clearance relation to said inlet port and normally in closed relation to said outlet port and a grooved portion adjoining the same and registrable with said outlet port when the tube section and its jaw-plates are contracted to a predetermined position, said pump unit being operable in response to contracting movements of said tube section to maintain substantially constant pressure in said cylinder means of said dashpot means after said outlet port is uncovered by said grooved portion for restraining collapse of said tube section.

14. A control device for shutting off the vacuum to the teat cup of a milking machine when the surge of milk substantially ceases, comprising a flexible contractible milk and vacuum flow tube section, means in substantially embracing relation to said tube section secured thereto to move therewith in response to the variation in vacuum therein and contractible about such section to a closed sealing position when the surges of milk substantially cease, a pair of fluid-charged cylinder and piston units having connection means securing the same to said embracing means for relative displacement therewith in response to the contracting movements thereof, and valved passages connecting the cylinders with each other for the interflow of fluid therebetween, a first of the cylinder-piston units having a space of capillary dimensions therebetween for leakage of fluid past the same and the cylinder thereof having a by-pass therein with which its piston is adapted to register for opening the by-pass at a predetermined point in the contraction of the tube section and its embracing means, said last-named cylinder having a well therein in discharging communication with one of said valved passages and into which any by-passed fluid is displaced, said connection means between said last-named piston and said embracing means being yieldable, the other of the cylinder-piston units being operable in response to contracting movements of said tube section to maintain substantially constant pressure in said cylinder of said first unit prior to opening of said by-pass therein for restraining collapse of said tube section.

15. A control device for shutting off the vacuum to the teat cup of a milking machine when the surge of milk substantially ceases, comprising a flexible contractible milk and vacuum flow tube section, means in substantially embracing relation to said tube section secured thereto to move therewith in response to the variation in vacuum therein and contractible about such section to a closed sealing position when the surges of milk substantially cease, a fluid pump-like unit secured to said embracing means for actuation thereby in response to the cyclic contracting and expanding movements of the tube section, and a dashpot unit disposed in like operative relation to said embracing means and having its cylinder in fluid communication with the cylinder of the pump unit, the operative securement of said dashpot unit comprising a yieldable connection between the piston of the same and the opposing element of said embracing means, said pump unit being operable upon said actuation thereof to maintain substantially constant pressure in said cylinder of said dashpot for restraining collapse of said tube section, and means in said dashpot unit for permitting a quick displacement of fluid therein when such parts reach a predetermined contracted position.

References Cited in the file of this patent

UNITED STATES PATENTS

| | | |
|---|---|---|
| 2,558,152 | Perkins | June 26, 1951 |
| 2,572,658 | Perkins | Oct. 23, 1951 |
| 2,614,530 | Perkins | Oct. 21, 1952 |
| 2,615,423 | Perkins | Oct. 28, 1952 |
| 2,670,754 | Perkins | Mar. 2, 1954 |

UNITED STATES PATENT OFFICE

CERTIFICATE OF CORRECTION

Patent No. 2,781,773                                    February 19, 1957

Albert G. Perkins

It is hereby certified that error appears in the printed specification of the above numbered patent requiring correction and that the said Letters Patent should read as corrected below.

Column 4, line 63, for "bent" read -- spent --.

Signed and sealed this 19th day of November 1957.

(SEAL)

Attest:
KARL H. AXLINE
Attesting Officer

ROBERT C. WATSON
                                                        Commissioner of Patents